Patented June 3, 1941

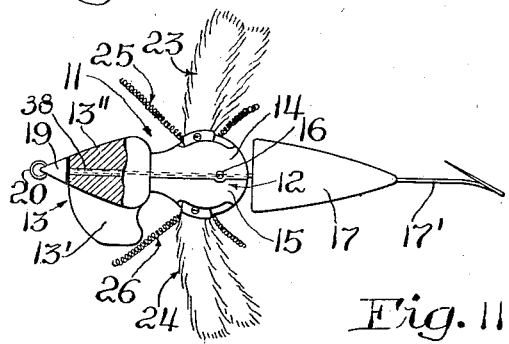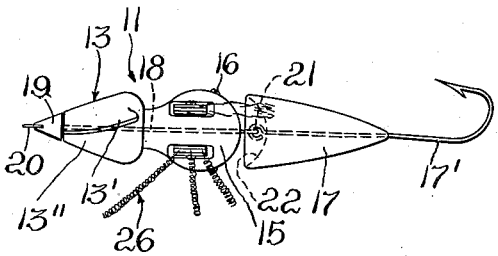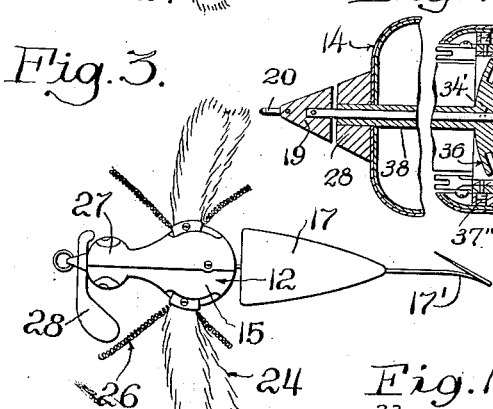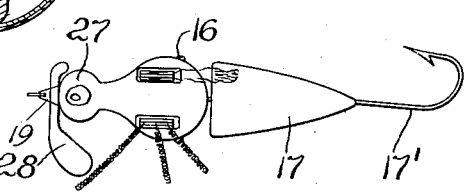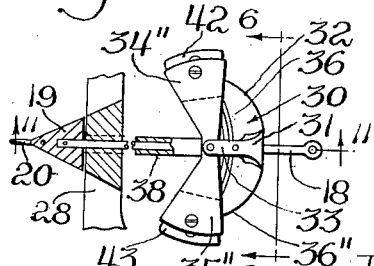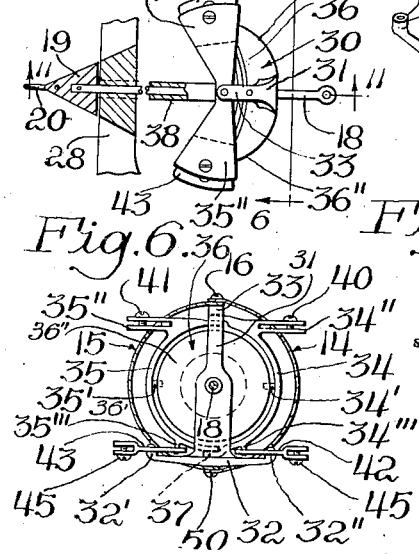

2,244,032

UNITED STATES PATENT OFFICE 2,244,032

ARTIFICIAL BAIT

Julius Timm, Evanston, Ill.

Application April 6, 1940, Serial No. 328,315

15 Claims. (Cl. 43—48)

This invention relates to artificial bait, and more particularly to means for effecting animation of the same.

An object of the invention is to provide an improved artificial bait wherein parts thereof representative of the movable parts of an insect or the like, may be given a fore and aft movement to simulate actuation of wings or of legs.

It is another object of the invention to provide means for actuating certain parts of an artificial bait wherein such movement may be given to one of the parts in the reverse direction from that movement given to the other of said parts.

It is another object of the invention to provide in such means, for actuating various parts of the bait, an actuating element which is so designed to give movement to a body or tail part of the bait in addition to the giving of movement to the wings or the legs thereof. In other words, the actuating element effects movement of not only the wings and legs of the bait, but also effects movement of different parts of the body elements relative to each other.

It is still another object of the invention to provide a power actuating unit which may be readily removed as a unit from the shell portions of the main body part of the bait, whereby, this unit may be placed in any type of a shell, and to the unit any type of wing portions or leg portions may be attached, the same depending upon the particular conditions in which the bait is to be used and upon the choice of the angler.

According to the present invention, there has been provided a unit adapted to be driven or powered by the water as the bait passes therethrough and which has a pair of wing portions extending respectively in opposite directions and a pair of leg portions likewise extending in opposite directions with respect to each other. The wing portions are located at a point above and vertically spaced from the leg portions. This unit consists of a main supporting member to which these portions are pivotally connected and the portions are in turn adapted to be actuated with fore and aft movement by a cam operated by the propeller actuating element as the bait passes through the water. These portions are pivoted on a vertical axis and the cam is so shaped as to provide similar motion to the respective portions at opposite sides of the bait, the cam working simultaneously on both of these portions. The portions to which the legs are connected will be given a movement in the reverse direction to the portions to which the wings are connected, and this is accomplished by means of a lever arrangement pivoted at a point laterally spaced from the vertical axis about which the main portions are pivoted. The main supporting body may have attached thereto the shell parts forming the body of the artificial bait, so that the mechanism of the unit will be thereby closed. To the rear end of the unit there may be attached the tail portion of the bait which in turn carries a hook.

For other objects and for a better understanding of the invention, reference may be had to the following detailed description taken in connection with the accompanying drawing, in which:

Figure 1 is a plan view of one form of the invention wherein the head portion of the insect is simulated by the propeller actuating element;

Figure 2 is a view in elevation of the form as shown in Figure 1, and illustrating the connection of the hook or tail portion to the actuating unit;

Figure 3 is a plan view of another form of the invention wherein a separate head portion is provided in addition to the propeller actuating element;

Figure 4 is a view in side elevation of the form of the invention shown in Figure 3;

Figure 5 is an enlarged detail and plan view of the form of the invention shown in Figure 3, partly in cross section of the actuating unit with the wing and leg elements removed;

Figure 6 is likewise an enlarged view taken along the line 6—6 of Figure 5 and including illustrations of how the unit may be disposed within the shell portions of the bait;

Figure 7 is a detail view illustrating a cam element utilized for the actuation of the fore and aft movable portions of the unit;

Figure 8 is a perspective view of a wing element;

Figure 9 is a perspective view of a leg element;

Figure 10 is a perspective view of the main supporting member; and,

Figure 11 is a longitudinal vertical section taken along the line 11—11 of Figure 5 and looking in the direction of the arrows thereof and with the shell body parts added.

Referring now particularly to Figures 1 and 2, there is shown in general a body portion 11 representative of the body of an insect or the like which forms an enclosure for an actuating unit indicated generally at 12 and having an element 13 adapted to be operated or powered by the water. This element 13 includes a fin 13' and a portion 13'' shaped to simulate the head portion of the insect. The body portion 11 may be of a solid unit into which the actuating unit 12 may be inserted or it may take the form of divided shell portions 14 and 15 adapted to be attached to the actuating unit 12 by means of screws 16.

Connected to the actuating unit 12 may be attached the tail or hook portion 17 with its hook 17' as illustrated particularly in Figure 2. This tail portion may be connected to a shaft 18 extending through the actuating unit and having at its forward end a head portion 19 having a ring 20 for the attachment to the angler's fish line.

It will be noted that the actuating element 13 has but a single fin 13'. This actuating element 13 will thereby in addition to giving actuating power to the unit will also give a wobbling effect of the artificial bait as it passes through the water to cause the tail portion 17 to pivot about its swivel connection 21 to the actuating unit for causing relative lateral movement between the tail portion and the actuating unit 12 or to the body portion 11 enclosing the actuating unit. This wobbling effect may be greatly enhanced by virtue of the provision of a hollowed surface 22 provided in the forward portion of the tail element 17 at its point of connection to the body. As the forward end of the tail 17 and the rearward part of the body 11 is thrown to one side or the other by the single fin 13', so that the beginning of the angular movement is effected between the same, the flow of water will readily sweep into and against the surface 22 to effect greater angling between these two parts, after which the parts will be similarly angled in the reverse direction by the propeller 13.

The actuating unit 12 is adapted to have attached thereto the wing portions 23 and 24 on their respective sides of the body 11 and also the leg portions 25 and 26 likewise at opposite sides respectively of the body portions 11.

Referring now to Figures 3 and 4, it should be noted that in this form of the invention the general arrangement is similar to the form shown in Figure 1 except that there is provided integral with the body portion 11 a head portion 27 and that the actuating element indicated at 28 is of different form than shown in Figures 1 and 2.

Referring now to Figures 5 to 11, inclusive, there is shown the actuating unit and the various parts thereof. This actuating unit comprises a supporting body 30 having a vertically extending portion 31 and a base portion 32. By virtue of the fact that the base portion 32 includes more material than the vertically extending portions 31, the body 30 tends to maintain the balance of the bait while in the water and tends to keep it upright as it proceeds through the water. The vertically extending portion 31 also has connected to its upper end a forwardly extending portion 33 adapted to serve as the upper pivot point for fore and aft pivotal elements 34 and 35 which are so shaped as to enclose a substantially circular shaped cam element 36. The elements 34 and 35 are likewise pivoted to the base portion 32 at a location 37 immediately below and in vertical alinement with a location on the forwardly extending portion 33 as indicated at 37'. At the respective locations 37 and 37' there are threaded holes which retain respectively the pivot pins 37'' and 37''', see Figure 11. It should be now apparent that the elements 34 and 35 are pivotable about a vertical axis and capable of being given a fore and aft movement with respect to this axis.

The cam element 36 has spaced portions 36' and 36'' between which is disposed projected pin portions 34' and 35' of the fore and aft movable elements 34 and 35 respectively. By the shaping of these portions 36' and 36'' and the cam 36, to be curved in the manner shown in Figure 7, it will be apparent that as this cam 36 is rotated with respect to the shaft 18, the portions 34 and 35 will be given a fore and aft pivotal movement. On the shaft 18 and to which the cam 36 is secured, is a sleeve 38 extending forwardly to a location near to the head portion 19 which is likewise secured to the forward end of the shaft 18. On this sleeve 38 there is fixed by welding or brazing the actuating element 28 of the form shown in Figures 3 and 4.

The elements 34 and 35 may have bifurcated portions 34'' and 35'' respectively by which the wing elements 39 of a form such as shown in Figure 8 may be secured by the tightening of screws 40 and 41 respectively adapted to pass through the opening 39' in the wing element 39. This wing element 39 may be of any form and may preferably include or have attached to its base, flexible material 39'' such as rubber, Celluloid, feathers or the like.

On the base element 32, which extends laterally to some extent, there may be provided the pivot points 32' and 32'' on which may be pivoted the levers 42 and 43 respectively which may be in turn connected to projections 34''' and 35''' on the fore and aft movable elements 34 and 35 whereby movement will be effected to the outer ends of these lever elements in the reverse direction to that given to the portions 34'' and 35'' to which the wing elements 39 are attached.

The outer ends of the lever elements 42 and 43 may likewise be bifurcated and adapted to receive a leg element 44 of the form shown in Figure 9. This leg element 44 may be attached by means of a screw 45 extending through an opening 44' in the element 44. To this element 44, there may be attached a plurality of projections 47', 48', and 49' of the flexible coil spring elements 47, 48, and 49, respectively. The projections 47', 48', and 49' permit the coil spring elements 47, 48, and 49 to be bent into any desired angle. In the present instance the legs are arranged as shown in Figure 9. The leg elements 44 are moved fore and aft about the pivots 32' and 32'' of the levers 42 and 43 which are actuated by the projections 34''' and 35''' on the elements 34 and 35.

The shell portion 11 may include two parts 14 and 15 which may be secured to the supporting body 30 as by means of a screw 50 connected to the portions 32 of the supporting body 30 and by means of the screw 16 connected to the forwardly extending portions 33 of the supporting body 30 at the top part of the supporting body. These shell portions may be any desired insect shell, and may be colored or figured as desired.

It should now be apparent that by the present invention there has been provided an actuating unit for an artificial bait wherein a fore and aft movement may be given to certain parts of the bait which simulate movements of parts of an insect or the like such as the wings and legs thereof and likewise that there has been provided in such a unit means whereby the legs may be given movement in the opposite direction to the movement of the wings, that is, while the wings are moving forward, the legs will be given a movement in the rearward direction. By the wings and legs so arranged for simultaneous reverse movement the resistance to the movement of the bait through the water because of friction is greatly reduced. It should also be apparent that there has been provided in such actuating unit means whereby a tail or hook portion connected to the supporting body thereof for lateral movement will be caused to pivot to thereby effect a wobbling movement of the bait as it passes through the water. It will also be apparent that the unit may have varied forms and shapes of body and tail portions connected to the same depending upon the wishes of the angler. These body and tail portions may be shaped as one may desire and that likewise wings and leg elements may be of different materials, and colorings, and shapes.

While various changes may be made in the detail construction of the present invention, it shall be understood that such changes shall be within the spirit and scope of the present invention as defined in the appended claims.

What is claimed is:

1. In an artificial fishing bait, a supporting body, a projecting portion pivoted about a vertical axis on the supporting body to have fore and aft movement with respect thereto to simulate a movable part of an insect or the like, and means adapted to be powered by movement through the water for actuating said projected portion.

2. In an artificial fishing bait, a supporting body, a pair of spaced projected portions movably mounted on said supporting body to simulate respectively movable parts of an insect or the like, means adapted to be powered by movement through the water for simultaneously actuating said projected portions, and said latter means including means assocated with one of the projected portions to effect movement thereof in a reverse direction to the movement of the other projected portion.

3. In an artificial fishing bait, a supporting body, a pair of vertically spaced projected portions pivotable respectively for fore and aft movement about their respective vertically disposed axes, the upper of said portions being representative of a wing of an insect while the lower of said portions being representative of a leg of an insect, means adapted to be powered by movement through the water for simultaneous actuation of the projected portions, and said latter means including means associated with the projected portion for the leg to effect pivotal movement thereof in a reverse direction to the pivotal movement of the projected portion representative of the wing.

4. An actuating unit for animating artificial bait, a supporting body, a pair of movable elements pivoted to said supporting body for fore and aft movement about a vertical axis, each of said elements having a concave face and being arranged so that the faces thereof oppose each other, means for actuating the elements including means adapted to be powered by the passage of the bait through the water, and a centrally disposed cam means between the two elements to move the same and shaped to effect simultaneous movement of the elements in the same direction, and said elements adapted to have certain parts associated therewith similar to certain of the propelling parts of an insect or the like.

5. An actuating unit for animating artificial bait, a supporting body, a pair of movable elements pivoted to said supporting body for fore and aft movement about a vertical axis, each of said elements having a concave face and being arranged so that the faces thereof oppose each other, means for actuating the elements including means adapted to be powered by the passage of the bait through the water, and a centrally disposed cam means between the two elements to move the same and shaped to effect simultaneous movement of the elements in the same direction, lever elements pivoted on the supporting body at opposite sides thereof respectively and connected respectively to the movable elements to be operated by the same and to thereby effect simultaneous movement but in an opposite direction, and said movable and lever elements adapted to certain parts associated therewith similar to certain of the propelling parts of an insect or the like.

6. In an artificial bait, a supporting body, a movable element connected to the supporting body for fore and aft movement with respect thereto and having means for the attachment thereto of a part resembling a propelling part of an insect or the like, a second movable element connected to the supporting body for fore and aft movement with respect thereto and having means for the attachment thereto of a part resembling another propelling part of an insect or the like, said second movable element connected to the first mentioned movable element to be moved thereby so that its part is moved in a reverse direction of the part of the first-mentioned element, and means for actuating the first mentioned element, whereby movement will be simultaneously imparted to both of said elements but in reverse directions.

7. In an artificial bait, a supporting body, an element pivoted to the supporting body and having means resembling a wing of an insect, and a second element pivoted to the supporting body and having means resembling a leg of an insect, said latter element being connected to said first element to be given simultaneous pivotal movement in a reverse direction with respect to the first mentioned element, and means for pivoting said first mentioned element to pivot said second mentioned element.

8. In combination, an actuating unit for animating artificial fishing bait, said unit having a supporting body and means for the attachment thereto of a movable part of an insect or the like, and a body shell part adapted to substantially enclose the actuating unit and fashioned to be representative of the body part of the insect, said shell part being attached to the supporting body, and a tail part having a fishhook thereon connected to said attachment means of the unit for pivotal movement with respect thereto.

9. In combination, an actuating unit for animating artificial fishing bait and including of itself parts fashioned to be representative of the head, wings and legs, respectively, of an insect or the like, a part adapted to substantially enclose said actuating unit except for the above mentioned parts and fashioned to be representative of a body of the insect, and a part representative of the tail part of an insect connected to the unit rearwardly of the connection of the body part thereto and for pivotal movement with respect to the latter.

10. In an artificial fishing bait, an actuating unit for animating the same and including a propeller element substantially fashioned in its central portion thereof to be representative of the head of an insect or the like, and a part adapted to substantially enclose said actuating unit except for the above mentioned propeller element and fashioned to be representative of a body of an insect.

11. In an artificial fishing bait, an actuating unit for animating artificial fishing bait and including of itself means for the attachment of parts representative of the propelling parts of an insect or the like, said unit likewise providing means for the attachment of other parts serving to make up the body of an insect or the like, said unit thereby forming the supporting structure to which body parts may be readily attached to make up the finished bait whereby the above mentioned parts for making up the bait may be selected from a variety of parts but may differ with regard to size, shape and color.

12. In an artificial fishing bait, body means and a tail means connected to the body means for free and uncontrolled angling movement with respect thereto, means associated with the body means for initiating angling movement between said body and tail means as the bait is being drawn through the water, and said tail means having a forward face hollowed to receive the force of the water and to thereby be given increased angling effect, whereby the bait will have a wobbling effect as it is drawn through the water.

13. In an artificial fishing bait, an actuating unit for animating the bait including a supporting body having a vertically extending portion and base portion, means extending forwardly of the supporting body and having means for connection of the unit to a fishing line, said unit having means for the attachment of parts thereto representative of parts of an insect or the like, and said base portion including sufficient material to serve as means aiding to maintain the bait in an upright position as it is drawn by the fishing line.

14. In an artificial fishing bait, an actuating unit including a supporting body, a shaft connected to the supporting body to extend forwardly and rearwardly thereof and having means on its forward end for the connection of the unit to a fishing line, said unit having means for the attachment of parts thereto representative of parts of an insect or the like, and including means associated with the shaft rearwardly of the supporting body for the attachment of one of the said parts.

15. In an artificial bait, a supporting body, a pair of projected portions representative of the propelling parts of an insect or the like respectively mounted on the supporting body for movement with respect thereto in substantially parallel planes, and means for simultaneously imparting movement to the projected portions to cause one portion to move in one direction while the other portion is moving in the reverse direction.

JULIUS TIMM.